United States Patent
Feist et al.

(10) Patent No.: US 10,059,380 B1
(45) Date of Patent: Aug. 28, 2018

(54) MOUNTING AN ACCESSORY TO A FRAME MEMBER

(71) Applicant: Ford Global Technologies, LLC, Dearborn, MI (US)

(72) Inventors: Larry Phillip Feist, Pinckney, MI (US); Daniel Ray Moss, Ortonville, MI (US); Richard J Anton, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/671,180

(22) Filed: Aug. 8, 2017

(51) Int. Cl.
| | |
|---|---|
| B62D 65/02 | (2006.01) |
| B62D 27/02 | (2006.01) |
| B60R 16/04 | (2006.01) |
| B60K 11/04 | (2006.01) |
| B62D 21/00 | (2006.01) |
| F02M 35/024 | (2006.01) |
| F01M 11/03 | (2006.01) |
| F01M 5/00 | (2006.01) |
| F16H 57/04 | (2010.01) |

(52) U.S. Cl.
CPC .............. *B62D 27/02* (2013.01); *B60K 11/04* (2013.01); *B60R 16/04* (2013.01); *B62D 21/00* (2013.01); *B62D 65/02* (2013.01); *F01M 5/002* (2013.01); *F01M 11/03* (2013.01); *F01M 2011/031* (2013.01); *F02M 35/02416* (2013.01); *F16H 57/0412* (2013.01)

(58) Field of Classification Search
CPC ......... B62D 27/02; B62D 65/02; B62D 21/00
See application file for complete search history.

(56) References Cited

U.S. PATENT DOCUMENTS

| | | | |
|---|---|---|---|
| 4,492,632 A | 1/1985 | Mattson | |
| 4,676,206 A | 6/1987 | DeGrazia | |
| 5,398,158 A | 3/1995 | Fisher et al. | |
| 5,868,426 A | 2/1999 | Edwards | |
| 6,568,745 B2 | 5/2003 | Kosuge | |
| 7,300,581 B2 | 11/2007 | Seipold | |
| 7,658,428 B2 | 2/2010 | Tietje | |
| 7,913,713 B2 * | 3/2011 | Nelson | B60P 1/162 137/354 |
| 8,801,036 B2 * | 8/2014 | Keatley | B60D 1/015 280/433 |
| 9,266,563 B1 * | 2/2016 | Han | B62D 21/11 |
| 2003/0209380 A1 * | 11/2003 | Anzai | B60K 5/1275 180/312 |
| 2010/0300324 A1 * | 12/2010 | Brandstetter | B61C 9/50 105/96.1 |

(Continued)

Primary Examiner — Brian L Swenson
(74) Attorney, Agent, or Firm — Gregory Brown; Diana D. Brehob; Brehob Law, PLLC (57) ABSTRACT

In certain situations, it is desirable to mount an engine accessory to a frame member of the vehicle. Such frame member might be a convenient structural element proximate a desired location for the engine accessory. Because the frame member is often hollow, conventional mounting techniques may crush it. A system and method for attaching first and second brackets to the frame member are disclosed. The bracket systems may have piloting, locating, and anti-rotation features to provide secure attachment points. A vehicle accessory is mounted at the distal ends of the first and second brackets.

17 Claims, 9 Drawing Sheets

(56) References Cited

U.S. PATENT DOCUMENTS

2013/0249250 A1\* 9/2013 Ohhama ................ B62D 21/11
                                                                         296/204
2016/0091079 A1\* 3/2016 Compton .............. F16H 57/025
                                                                         248/674

\* cited by examiner

MOUNTING AN ACCESSORY TO A FRAME MEMBER

FIELD

The present disclosure relates to mounting accessories to a hollow frame member of a vehicle or other piece of equipment.

BACKGROUND

Packaging can be very tight in the engine compartment associated with an automotive vehicle. In certain situations, it is desirable to mount an engine accessory to a frame member of the vehicle. Such frame member might be a convenient element in the vicinity of a desired location for the engine accessory to be mounted. The frame member is often hollow and is typically fabricated with loose tolerances. Conventional mounting techniques would crush such a hollow member. A way to mount an accessory without crushing the hollow member is desired.

SUMMARY

To overcome at least one problem in the prior art, an automotive vehicle is disclosed that has a hollow frame member having a plurality of orifices defined therein, a first bracket and a second bracket coupled to first and second locations of the member, respectively, and a vehicle accessory coupled between the first and second brackets. Alternatively, these holes can be machined into the cross member. This can be applied to a vehicle in service, assembled vehicle, and original mass production.

The vehicle accessory is one of: an oil filter, an oil cooler, a radiator, a transmission cooler, a battery, a fluid reservoir, and an air filter.

The hollow frame member has a rectangular cross section and the first bracket couples on a first side of the rectangular frame member and the second bracket couples on a second side of the rectangular frame member A first end of the first bracket that couples with the frame member has a lip that extends over an edge of the first side of the rectangular frame member. The lip minimizes rotation of the first bracket with respect to the rectangular frame member.

An end of the first bracket that couples with the frame member has pilot members that engage with one of the orifices of the frame member.

The first bracket has a threaded opening proximate the pilot members, the opening being positioned over the one orifice of the frame member with which the pilot members engages. The vehicle also has a bolt that engages with the threads of the opening.

The vehicle also has a washer sandwiched between the frame member and a head of the bolt. The washer has a substantially greater surface area in contact with the frame member than a surface area of the head of the bolt in contact with the washer. In some embodiments, the washer is integrally formed.

The vehicle also has a threaded nut having ears that extend outwardly and have pilot members that extend through one of the orifices on the frame member. The threaded nut is located on the interior of the frame member.

The vehicle also has a washer. The washer sandwiches the second bracket and the frame member. The washer has an engagement feature that extends into the one orifice engaging with the pilot of the threaded nut. A bolt that engages with the threads of the threaded bolt with a head of the bolt on the exterior of the frame member.

Ends of the first and second brackets distal from the frame member have mounting features for the vehicle accessory.

Some embodiments include column located largely within the frame member with a first end of the column having a pilot feature that engages with an opening in the frame member and a second end of the column extending out of the frame member. The column has a non-round cross-sectional shape for at least a portion of the length of the column.

Also disclosed is a method to attach a vehicle accessory to a frame member that includes: attaching a first bracket to the frame member having a plurality of orifices; attaching a second bracket to the frame member wherein the first and second bracket members are located opposite each other with respect to a centerline of the frame member; and attaching the vehicle accessory to the first and second brackets.

The attaching a first bracket includes: placing the first bracket onto the frame member; engaging a pilot associated with the first bracket with one of the plurality of orifices in the frame member; fishing a washer into the frame member; inserting a hollow alignment tool into an orifice of the frame member that is opposite the one orifice with the pilot engaged; engaging the alignment tool with the washer; inserting a bolt with an associated driver into the hollow alignment tool; and engaging the threads of the bolt with threads associated with the first bracket.

The method may further include fishing a threaded nut into the frame member; positioning the threaded nut coincident with an orifice of the frame member; placing a washer on the outside of the frame member proximate the orifice of the frame member wherein the washer has an engagement feature of the washer engaging with the threaded nut; inserting a bolt through the washer on the outside of the frame member; and engaging threads of the bolt with threaded of the threaded nut.

Also disclosed is a vehicle frame that has a hollow frame member having a plurality of orifices defined therein; a first bracket and a second bracket coupled to first and second locations of the member, respectively; and a vehicle accessory coupled between the first and second brackets. The hollow frame member is substantially rectangular. The first and second brackets are coupled at substantially the same location along the length of the hollow frame member. The first and second brackets are coupled substantially opposite each other with respect to a center line of the frame member.

A first end of the first bracket that couples with the frame member has a lip that extends over an edge of the first side of the rectangular frame member, such lip preventing rotation of the first bracket with respect to the rectangular frame member.

The first bracket has a threaded opening proximate a pilot and the opening is positioned over the one orifice of the frame member with which the pilot engages. The vehicle frame may further include a washer sandwiched between the frame member and a head of the bolt wherein the washer has a substantially greater surface area in contact with the frame member than a surface area of the head of the bolt in contact with the washer and a bolt that engages with the threads of the opening.

The vehicle may further include a threaded nut having ears that extend outwardly and having a pilot that extends through one of the orifices on the frame member wherein the threaded nut is located on the interior of the frame member; a washer wherein the washer sandwiches the second bracket and the frame member; and the washer has an engagement feature that extends into the one orifice engaging with the pilot of the threaded nut; and a bolt that engages with the threads of the threaded bolt with a head of the bolt on the exterior of the frame member.

In some embodiments, the frame also has a column extending through the frame member. A first bolt engages with threads in a first end of the column and with an opening in the first bracket. A threaded weld nut is affixed to an inner surface of the frame member. A second bolt engages with threads of the weld nut and with an opening in the second bracket.

In some embodiments, the column is substantially hexagonal at first end of the column. A hexagonal orifice is provided in the frame member proximate the location of the column. The hexagonal end of the column engages with the hexagonal orifice. A hex nut slid over a second end of the column and a bolt slid into the hex nut. The bolt has threads engaging with internal threads of the column at the second end of the column.

An advantage of the present disclosure is that a vehicle accessory may be mounted on a frame member, which is already available in the engine compartment, i.e., no additional hardware need be installed for the vehicle accessory. This provides more mounting options and helps with packaging.

Yet another advantage is that some embodiments of the disclosure are tolerant to variation in the dimension of the hollow frame member and tolerant to stack up issues.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
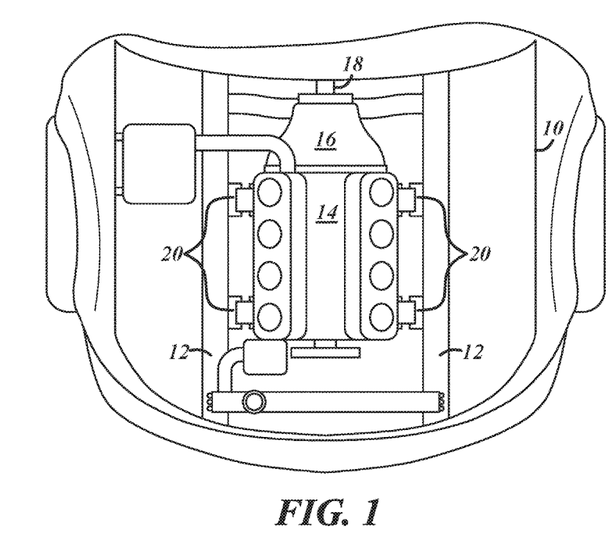
FIG. 1 is an illustration of a vehicle with frame members.

In FIG. 1, a portion of a vehicle 10 has frame components 12 to which an engine 14 with a transmission 16 and an output shaft 18 is mounted on frame components 12 via engine mounts 20.

Figure 2:
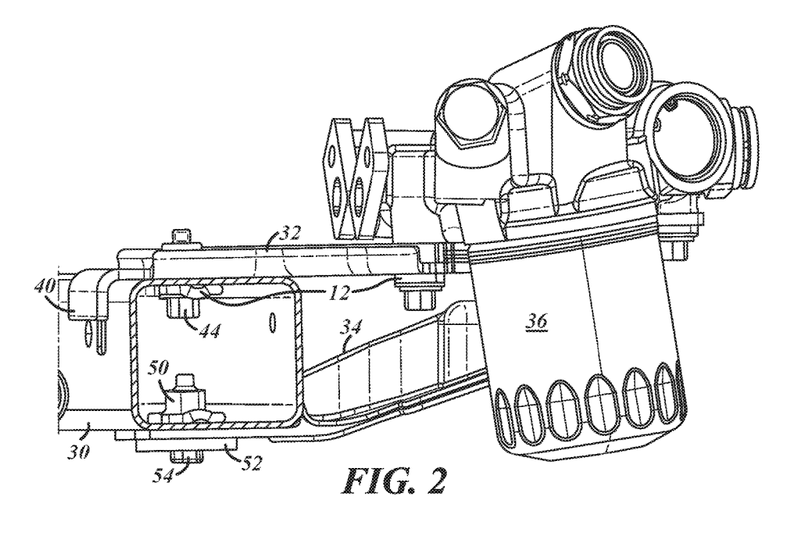
FIG. 2 is an illustration of a portion of a frame member with two brackets coupled to the frame member and a vehicle accessory coupled to the two brackets.

Referring now to FIG. 2, a cut portion of a frame member 30 is shown with a first bracket 32 and a second bracket 34 coupled thereto. An oil filter 36 is secured by coupling to first and second brackets 32 and 34. First bracket 32 couples to frame member 30 via a bolt 44, a washer 42. More detail about the characteristics of the components and how to assemble the components are described below. Second bracket 34 couples to frame member 30 via a bolt 54, threaded nut 50, and a washer 52.

Figures 3, 7:
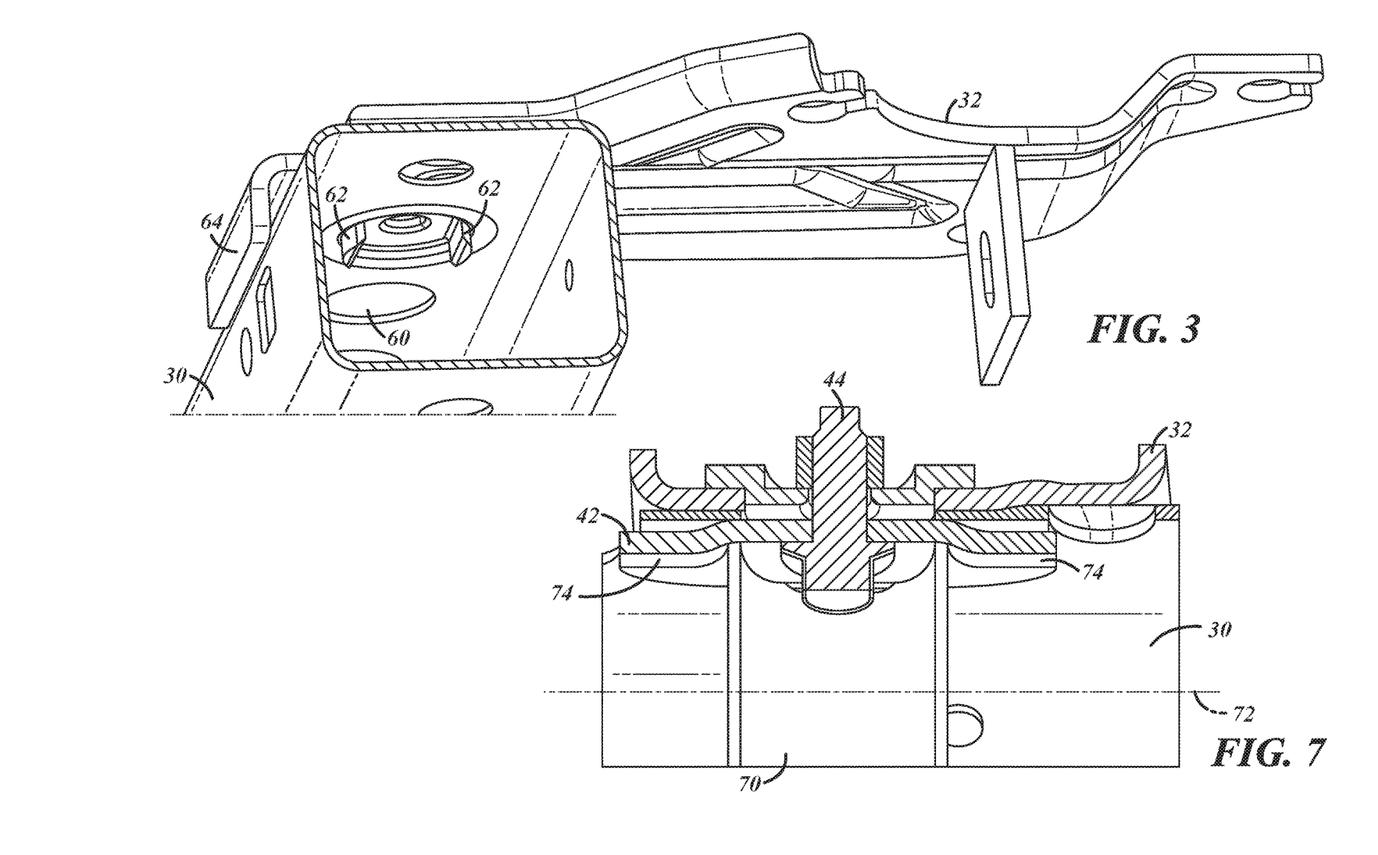
FIGS. 3, 4, 5, 6, and 7 each show a portion of the frame member in various stages of assembly of the first bracket according to embodiments of the disclosure.

In FIG. 3, a portion of the frame member 30 is shown. Frame member 30 typically has a plurality of holes (one of which is shown as 60), which can be provided to reduce weight. First bracket 32 has a pair of pilot features 62 that engage with one of the holes in frame member 30. First bracket 32 has a lip 64 that engages with an edge of frame member 30. Lip 64 prevents rotation of first bracket 32 with respect to frame member 30.

Figure 4:
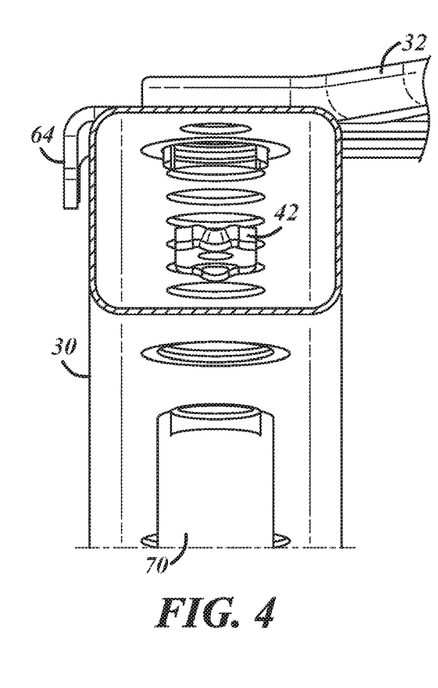
Figure 5:
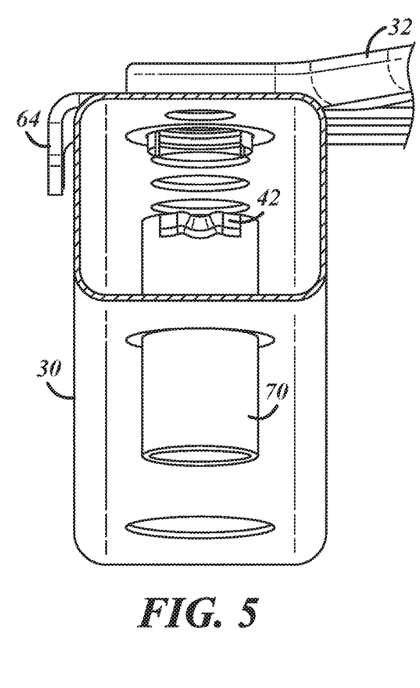
Figure 6:
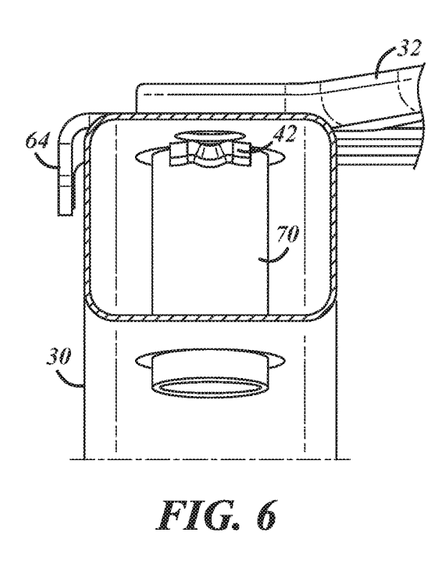

In FIG. 4, a washer 42 is provided with a special tool 70. In FIG. 5, washer 42 engages with tool 70. In FIG. 6, the washer is snugged up against an inside surface of frame member 30. Bracket 32 is shown in cross section and fully assembled on frame member 30. A bolt 44 engages with threads in an opening of bracket 32. Washer 42 has ears 74 that extend along the direction of a centerline 72 of frame member 30. Ears 74 extend beyond the opening in frame member 30 in which pilot features of bracket 32 are engaged. Special tool 70, is removed after first bracket 32 is secured to frame member 30.

Figures 8, 9:
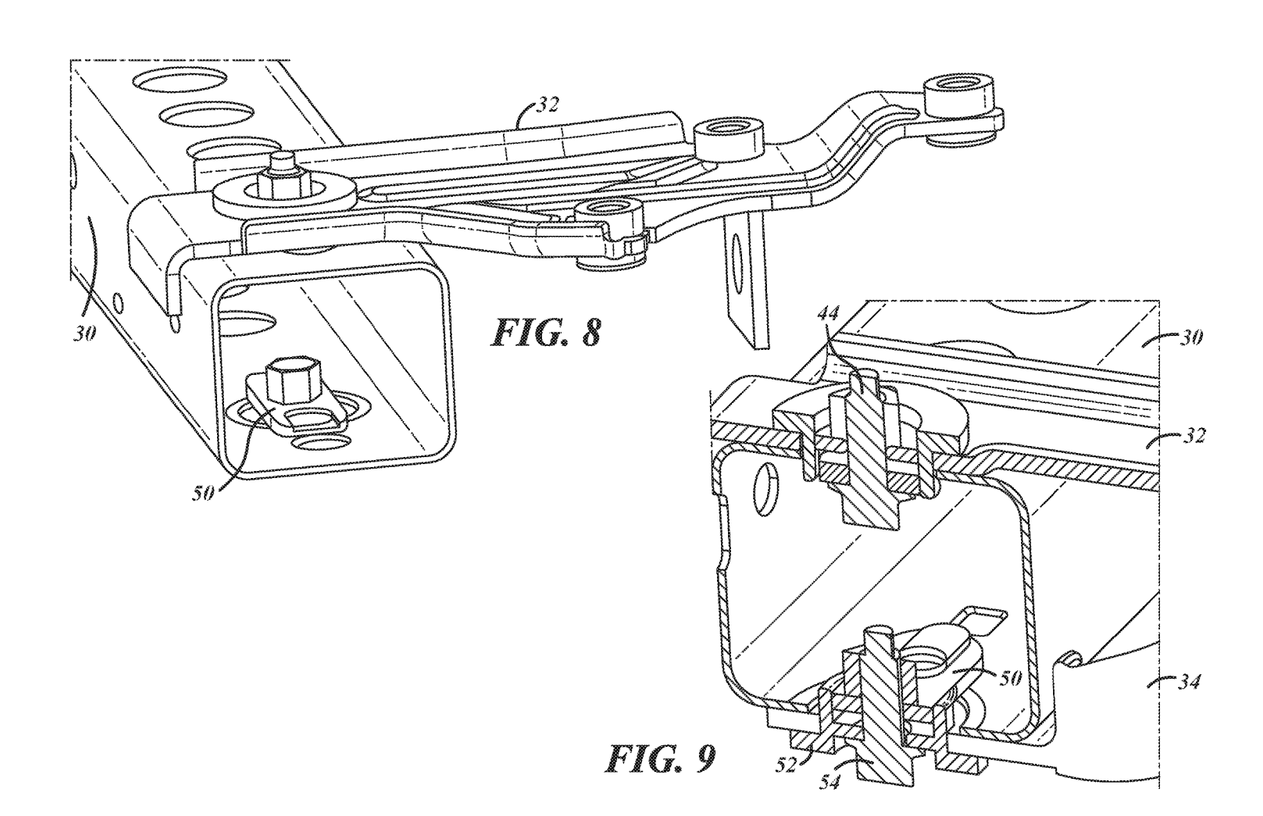
FIGS. 8 and 9 each show a portion of the frame member in various stages of assembly of the second bracket according to embodiments of the disclosure.

In FIG. 8, a threaded nut 50 is positioned across a through hole in frame member 30. Threaded nut 50 is fished through a larger hole in frame member 30. Second bracket 34 is positioned on an outside surface of frame member 30 with a washer 52 positioned against second bracket 34. Threads of a bolt 54 engage with threads of threaded nut 50 to snug up second bracket 34 and washer 54 against frame member 30.

Figure 10:
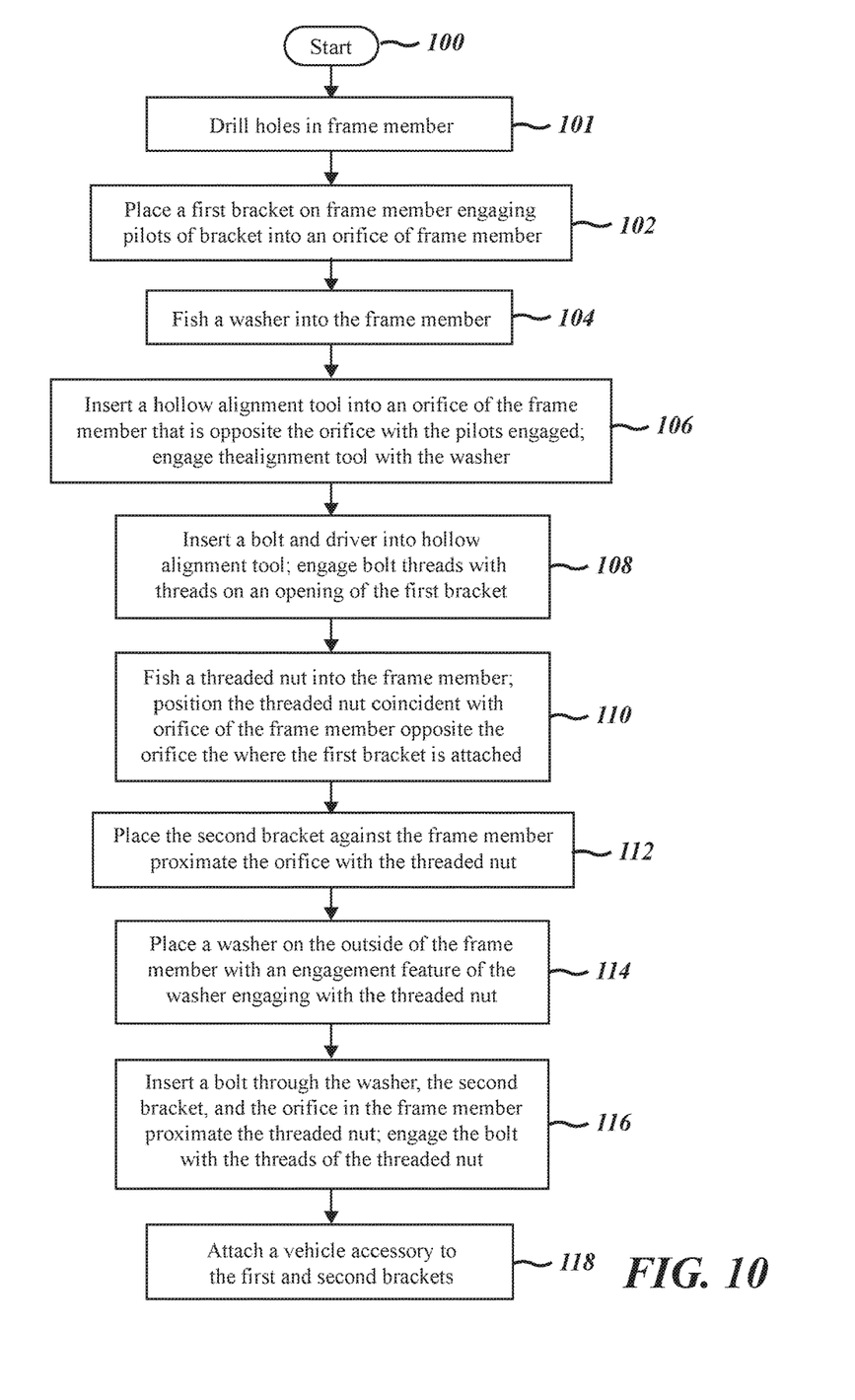
FIG. 10 is a flowchart of processes by which two brackets are assembled on a frame member.

In FIG. 10, a process for assembly starts at 100. In some embodiments, a hole or orifice is not provided in the frame member in the desired location. For such embodiments, a block 101 shows machining such holes that are desired. In block 102, a first bracket is placed on the frame member engaging pilots of the bracket into an orifice of the frame member. In block 104, a washer is fished into the frame member. In block 106, a hollow alignment tool is inserted into an orifice of the frame member that is opposite the orifice with the pilots engaged. The alignment tool engages with the washer. In block 108, a bolt and driver are inserted into the hollow alignment tool; the driver is rotated to cause the bolt threads to engage with threads on the opening of the first bracket. The bolt is snugged to secure the first bracket. In block 110, a threaded nut is fished into the frame member; the threaded nut is coincident with the orifice of the frame member opposite the orifice where the first bracket is attached. In block 112, the second bracket is placed against an outside surface of the frame member proximate the orifice where the threaded nut is positioned. In block 114, a washer is placed on the outside of the frame member with an engagement feature of the washer engaging with the threaded nut. In block 116, a bolt is inserted through the washer, the second bracket and the orifice of the frame member to engage with threads of the threaded nut. The bolt is snugged so that the second bracket is secured to the frame member. In block 118, a vehicle accessory is secured to first and second brackets.

The embodiments represented in FIGS. 2-9 are suitable for a running vehicle change, i.e., vehicle retrofit after assembly or late in design process. In some cases, the change in the design is made early in the process allowing a variation to the embodiments depicted in FIGS. 2-9.

Figure 11:
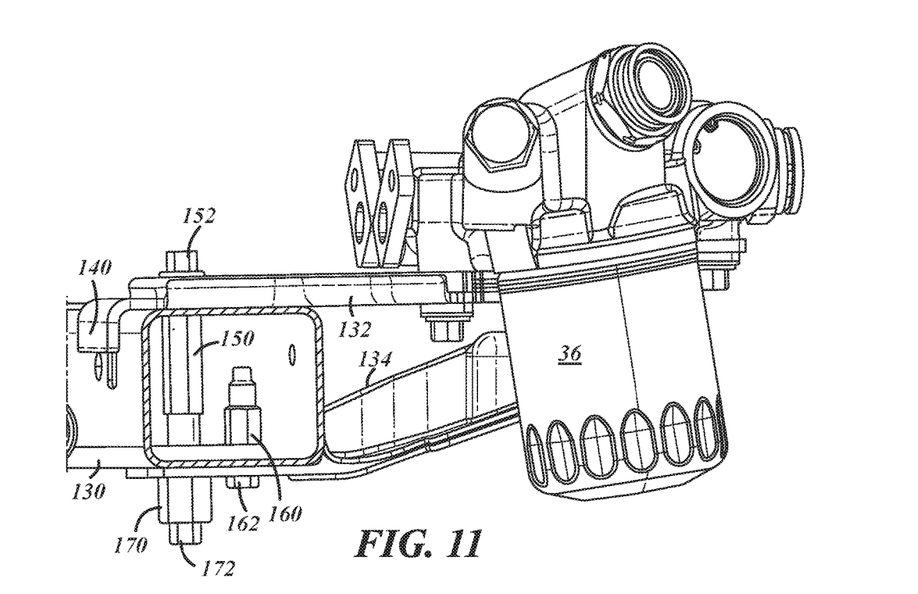
FIG. 11 is an illustration of a portion of a frame member with two brackets coupled to the frame member and a vehicle accessory coupled to the two brackets.

In FIG. 11, an assembly of two brackets 132 and 134 onto a frame member 130 is shown with an oil pump 36 coupled between brackets 132 and 134. A hex column 150 is inserted into frame member 130 providing a column to avoid crushing frame member 130 when tightening the bolts holding the brackets.

Figure 12:
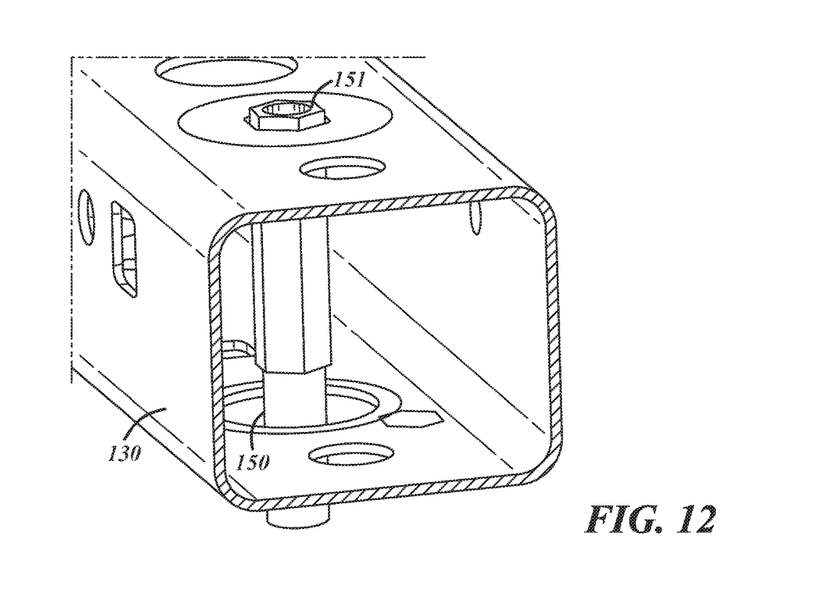
FIGS. 12, 13, 14, 15, and 16 show a portion of a frame member in various stages of assembly of the first and second brackets according to embodiments of the disclosure.

Referring now to FIG. 12, a portion of frame member 130 is shown with hex column 150. Alternatively hex column can be other than hexagonal along its length. One end 151 of hex column engages with an opening in frame member 130 serving as a pilot and for anti-rotational control Other cross-sectional shapes are possible as well.

Figures 13, 14:
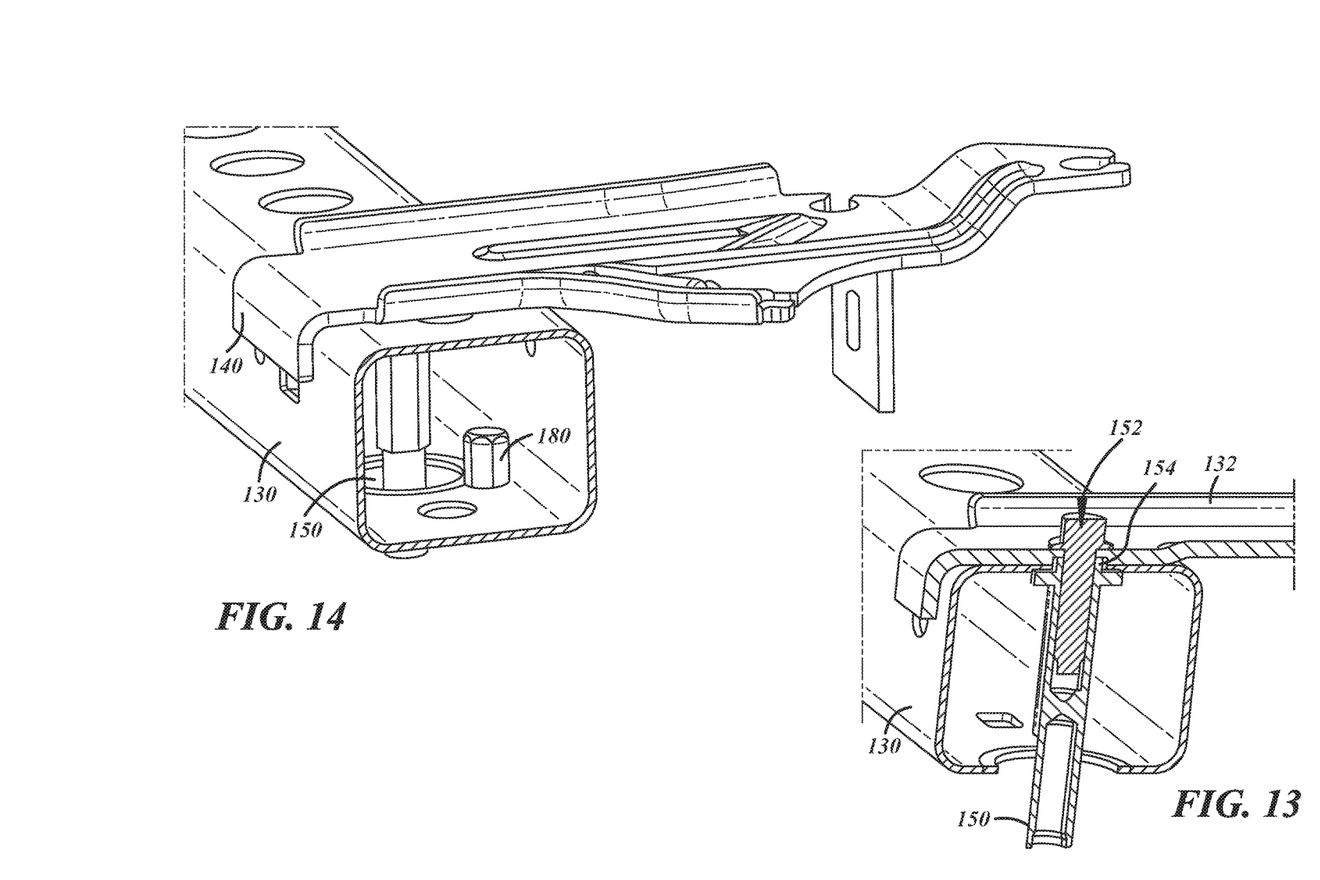

In FIG. 13, upper bracket 132 is placed over hex column 150 and bolted together via bolt 152. In some embodiments, hex column 150 has pilots 154 that extend upwardly to engage with upper bracket 132.

Figure 15:
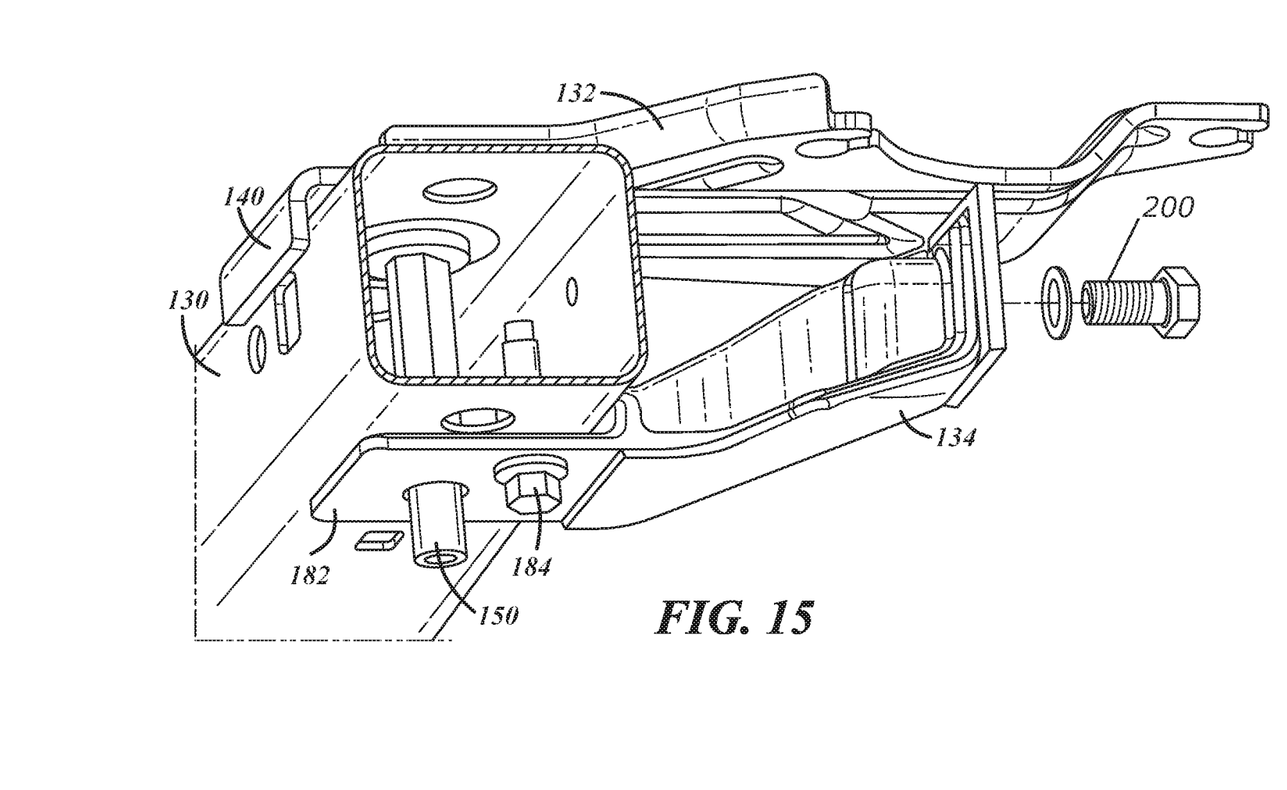

In FIG. 14, a weld nut 180 is installed onto frame member 130. Referring now to FIG. 15, lower bracket 134 and a plate 182 are installed on a lower surface of frame member 130 via a bolt 184 that engages with weld nut 180. Lower bracket 134 engages with a lower end of hex column 150 and bolt 184, which is offset from hex column 150. This locates bracket 134 and minimizes rotation. A bolt 200 couples upper bracket 132 with lower bracket 134 away from frame member 130.

Figure 16:
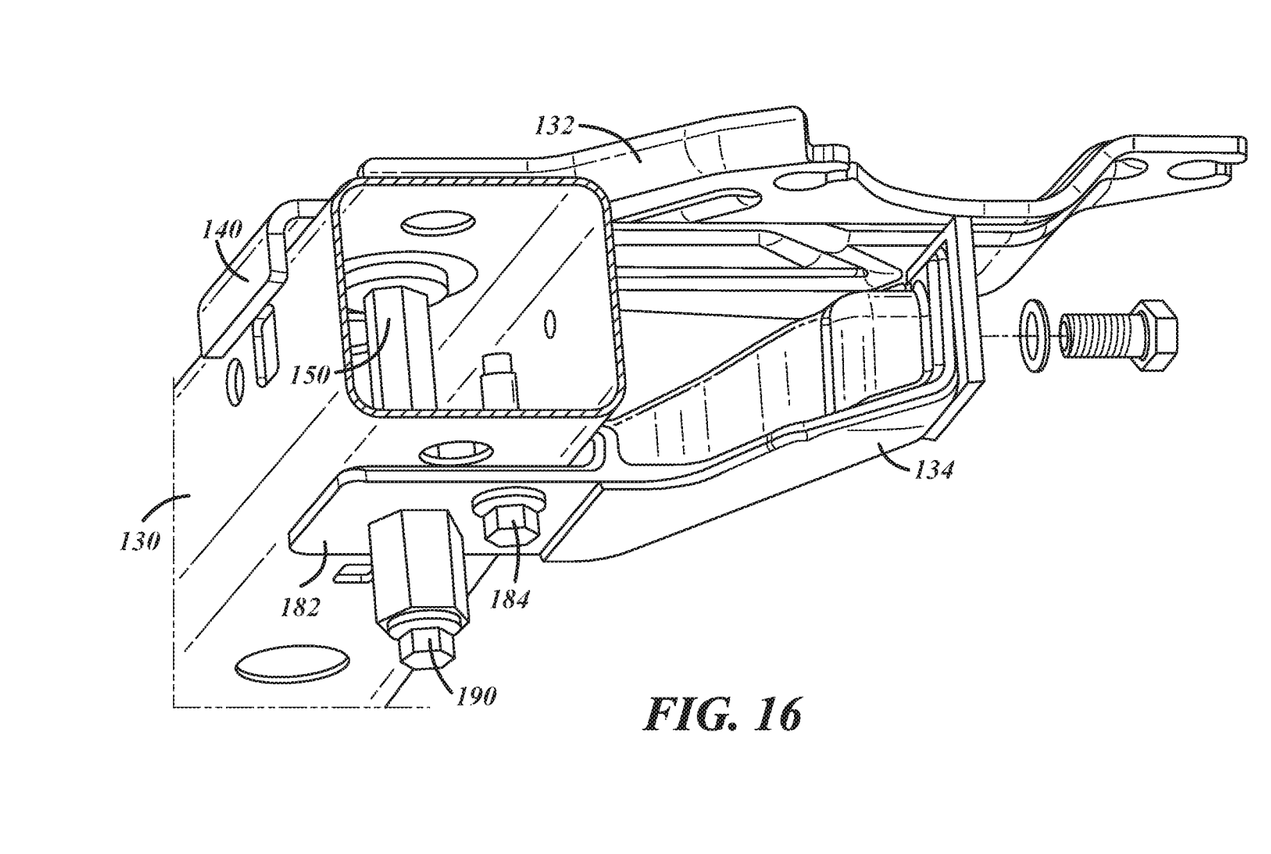

In FIG. 16, a hex spacer 192 and a hex bolt 190 engage with hex column 150 and are snugged up against plate 182. Hex column 150 prevents crushing of frame member 130 during the tightening process of securing brackets 132 and 134 to frame member 130.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An automotive vehicle, comprising:
   a hollow frame member having a plurality of orifices defined therein;
   a first bracket and a second bracket coupled to first and second locations of the member, respectively;
   a vehicle accessory coupled between the first and second brackets: and
   a threaded nut having ears that extend outwardly and pilot members that extend through one of the orifices wherein the threaded nut is located on the interior of the frame member.

2. The automotive vehicle of claim 1 wherein the vehicle accessory comprises one of: an oil filter, an oil cooler, a radiator, a transmission cooler, a battery, a fluid reservoir, and an air filter.

3. The automotive vehicle of claim 1 wherein the hollow frame member has a rectangular cross section and the first bracket couples on a first side of the rectangular frame member and the second bracket couples on a second side of the rectangular frame member.

4. The automotive vehicle of claim 3 wherein a first end of the first bracket that couples with the frame member has a lip that extends over an edge of the first side of the rectangular frame member, such lip preventing rotation of the first bracket with respect to the rectangular frame member.

5. The automotive vehicle of claim 1 wherein an end of the first bracket that couples with the frame member has pilot members that engage with one of the orifices of the frame member.

6. The automotive vehicle of claim 5 wherein the first bracket comprises a threaded opening proximate the pilot members, the opening being positioned over the one orifice of the frame member with which the pilot members engage, the automotive vehicle further comprising: a bolt that engages with the threads of the opening.

7. The automotive vehicle of claim 1, further comprising:
   a washer wherein the washer sandwiches the second bracket and the frame member; and the washer has an engagement feature that extends into the one orifice engaging with the pilot members of the threaded nut; and
   a bolt that engages with the threads of the threaded bolt with a head of the bolt on the exterior of the frame member.

8. The automotive vehicle of claim 1 wherein ends of the first and second brackets distal from the frame member have mounting features for the vehicle accessory.

9. The automotive vehicle of claim 1, further comprising:
   a column located mostly within the frame member with a first end of the column having a pilot feature that engages with an opening in the frame member and a second end of the column extending out of the frame member wherein the column has a non-round cross-sectional shape for at least a portion of the length of the column.

10. A method to attach a vehicle accessory to a frame member, comprising:
    attaching a first bracket to the frame member having a plurality of orifices;
    attaching a second bracket to the frame member wherein the first and second bracket members are located opposite each other with respect to a centerline of the frame member;
    attaching the vehicle accessory to the first and second brackets;
    fishing a threaded nut into the frame member;
    positioning the threaded nut coincident with an orifice of the frame member;
    placing a washer on the outside of the frame member proximate the orifice of the frame member the washer having an engagement feature of the washer engaging with the threaded nut;

inserting a bolt through the washer on the outside of the frame member; and engaging threads of the bolt with threads of the threaded nut.

11. The method of claim 10 wherein the attaching a first bracket comprises:

placing the first bracket onto the frame member;

engaging a pilot member associated with the first bracket with one of the plurality of orifices in the frame member;

fishing a washer into the frame member;

inserting a hollow alignment tool into an orifice of the frame member that is opposite the one orifice with the pilot members engaged;

engaging the alignment tool with the washer;

inserting a bolt with an associated driver into the hollow alignment tool; and engaging the threads of the bolt with threads associated with the first bracket.

12. The method of claim 10 wherein the vehicle accessory comprises one of: an oil filter, an oil cooler, a radiator, a transmission cooler, a battery, a fluid reservoir, and an air filter.

13. A frame, comprising:

a hollow frame member having a plurality of orifices defined therein;

a first bracket and a second bracket coupled to first and second locations of the member, respectively, the first bracket defining a threaded opening and having pilot members proximate the threaded opening;

an accessory coupled between the first and second brackets wherein the hollow frame member is substantially rectangular; the first and second brackets are coupled at substantially the same location along the length of the hollow frame member; and the first and second brackets are coupled substantially opposite each other with respect to a center line of the frame member;

a bolt that engages with the threads of the threaded opening; and a washer sandwiched between the frame member and a head of the bolt wherein:

the threaded opening is positioned over the one orifice of the frame member with which the pilot members engage; and the washer has a substantially greater surface area in contact with the frame member than a surface area of the head of the bolt in contact with the washer.

14. The frame of claim 13 wherein a first end of the first bracket that couples with the frame member has a lip that extends over an edge of the first side of the rectangular frame member, such lip preventing rotation of the first bracket with respect to the rectangular frame member.

15. The frame of claim 13, further comprising:

a threaded nut having ears that extend outwardly and having a that extends through one of the orifices on the frame member wherein the threaded nut is located on the interior of the frame member;

a washer wherein the washer sandwiches the second bracket and the frame member; and the washer has an engagement feature that extends into the one orifice engaging with the pilot of the threaded nut; and a bolt that engages with the threads of the threaded bolt with a head of the bolt on the exterior of the frame member.

16. The frame of claim 13, further comprising:

a column extending through the frame member;

a first bolt that engages with threads in a first end of the column and with an opening in the first bracket;

a threaded weld nut applied to an inner surface of the frame member; and a second bolt that engages with threads of the weld nut and with an opening in the second bracket.

17. The frame of claim 16 wherein:

the column is substantially hexagonal at a first end of the column;

a hexagonal orifice is provided in the frame member proximate the location of the column; and the hexagonal end of the column engages with the hexagonal orifice, the frame further comprising:

a hex nut slid over a second end of the column; and a bolt slid into the hex nut, the bolt having threads that engage with internal threads of the column at the second end of the column.

* * * * *